US011843626B2

(12) United States Patent
Levin et al.

(10) Patent No.: US 11,843,626 B2
(45) Date of Patent: Dec. 12, 2023

(54) CONNECTED COMPONENT-BASED COLLABORATIVE FILTERING IN RECOMMENDATION INTRUSION DETECTION SYSTEMS

(71) Applicant: Microsoft Technology Licensing, LLC, Redmond, WA (US)

(72) Inventors: Roy Levin, Haifa (IL); Idan Hen, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/246,391

(22) Filed: Apr. 30, 2021

(65) Prior Publication Data
US 2022/0353288 A1 Nov. 3, 2022

(51) Int. Cl.
*H04L 29/00* (2006.01)
*H04L 9/40* (2022.01)
(52) U.S. Cl.
CPC ........ *H04L 63/1433* (2013.01); *H04L 63/102* (2013.01); *H04L 63/1441* (2013.01)
(58) Field of Classification Search
CPC ............. H04L 63/1433; H04L 63/102; H04L 63/1441
See application file for complete search history.

(56) References Cited

U.S. PATENT DOCUMENTS

| | | | | |
|---|---|---|---|---|
| 10,073,892 | B1* | 9/2018 | Khare | G06F 16/26 |
| 11,349,845 | B2* | 5/2022 | Edwards | H04L 63/10 |
| 2017/0063905 | A1* | 3/2017 | Muddu | H05K 999/99 |
| 2017/0206581 | A1* | 7/2017 | Feierfeil | G06Q 30/0631 |
| 2019/0163829 | A1* | 5/2019 | Puri | G06F 16/9535 |
| 2019/0236213 | A1* | 8/2019 | Palmert | G06Q 30/0631 |
| 2019/0278922 | A1* | 9/2019 | Levin | H04L 63/1433 |
| 2020/0128047 | A1 | 4/2020 | Biswas et al. | |
| 2020/0274894 | A1* | 8/2020 | Argoeti | G06F 7/556 |
| 2020/0379776 | A1* | 12/2020 | Lo | G06Q 30/0254 |
| 2021/0126936 | A1* | 4/2021 | Gerber, Jr. | H04L 63/20 |

OTHER PUBLICATIONS

Winlaw, et al., "Algorithmic Acceleration of Parallel ALS for Collaborative Filtering: Speeding up Distributed Big Data Recommendation in Spark", In Proceedings of the IEEE 21st International Conference on Parallel and Distributed Systems, Dec. 14, 2015, pp. 682-691.
"International Search Report and Written Opinion Issued in PCT Application No. PCT/US22/023567", dated Jul. 20, 2022, 9 Pages.

* cited by examiner

*Primary Examiner* — Don G Zhao
(74) *Attorney, Agent, or Firm* — Wade IP Law PLLC

(57) ABSTRACT

A system to determine an intrusion risk and take action is described. The system collaboratively filters a combination based on a user access and a network item in a computer network to determine an associated recommendation score. The system determines connected components of a model of the computer network and separately collaboratively filters the connected components to determine the recommendation score as a measure of intrusion risk. An action is taken on the user access based on the intrusion risk.

20 Claims, 5 Drawing Sheets

CONNECTED COMPONENT-BASED COLLABORATIVE FILTERING IN RECOMMENDATION INTRUSION DETECTION SYSTEMS

BACKGROUND

Collaborative filtering mechanisms can be applied in various systems such as recommendation systems including cyberattack intrusion detection systems. In a common example, recommendation systems can be designed to analyze user data to recommend items such as movies, music, or other goods or services to consumers. Collaborative filtering is often used to recommend items to the users based on collected preferences and tastes from many users. Cybersecurity applications include the use of collaborative filtering to build an association of operational data and structures between accessors of a computer system to items of the computer systems to determine an intrusion risk. The associations are used as an indication as to whether a particular behavior on the computer system is likely to be a normal behavior and is used to detect cyberattacks on the computer system.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

A system to determine an intrusion risk via collaborative filtering and take action is described. The system collaboratively filters a combination based on a user access and a network item in a computer network to determine an associated recommendation score. The system determines connected components of a model of the computer network and separately collaboratively filters the connected components to determine the recommendation score as a measure of intrusion risk. An action is taken on the user access based on the intrusion risk. Examples in which the users and network items are modeled as a bipartite graph, separately collaboratively filtering the connected components, such as concurrently processing the connected components, can yield improved performance over processing a single bipartite graph with many connected components.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
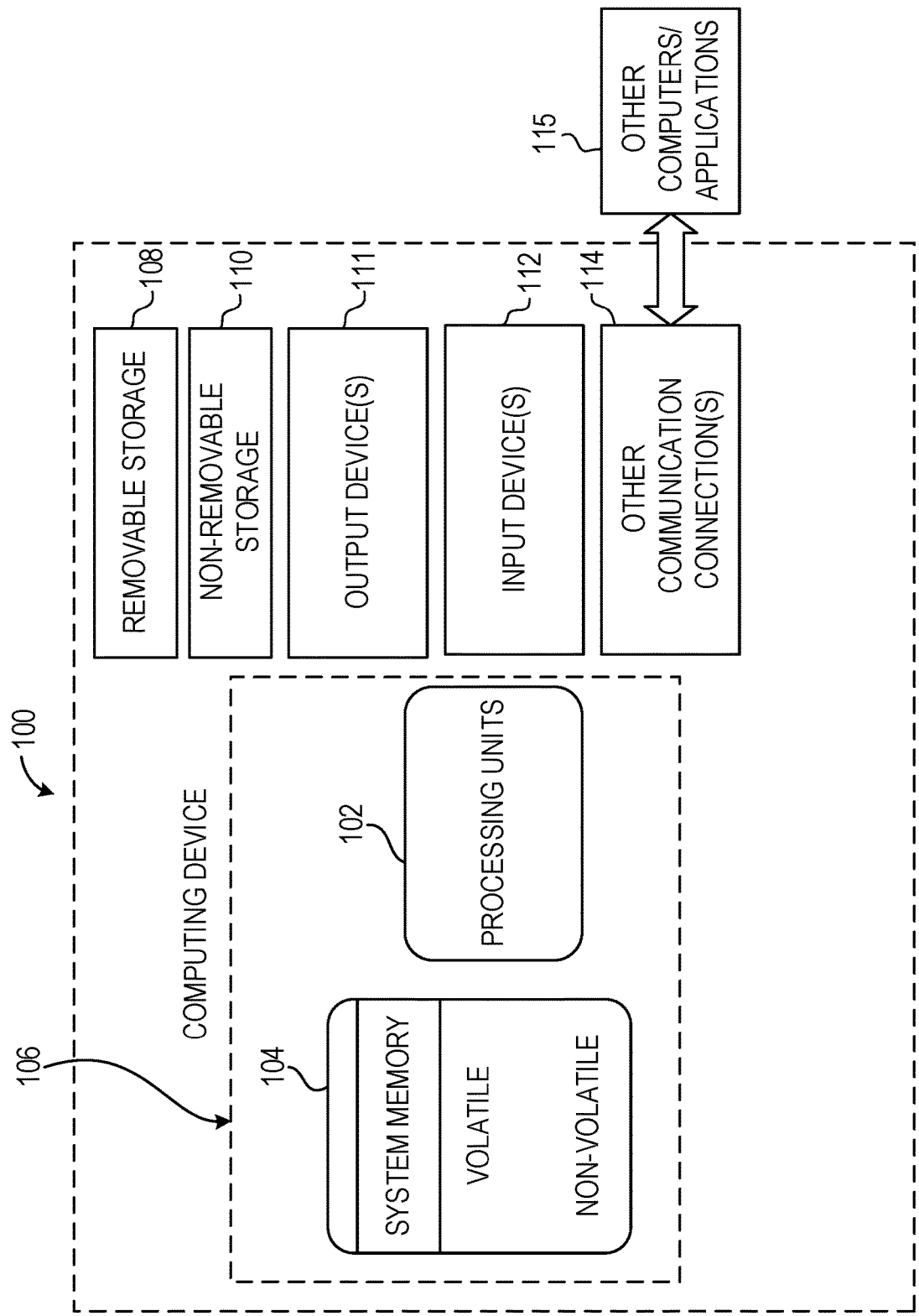
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Cyberattacks can include unauthorized operations done to an item in a computer network such as to an item in a storage device, or storage, and in particular, as unauthorized attempts to access an item in cloud storage. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's storage account is by using social engineering techniques like phishing or by using a storage key that has unintentionally been leaked by an account owner. Hence, one challenge of storage security is to recognize suspicious activity in an account even when the activity is apparently being done by a legitimate user of the account.

Some familiar solutions look for specific attack types such as ransomware attacks, but do not detect other kinds of attacks such as malware insertion, backdoor insertion, or unauthorized storage of data. Detection tools tailored to detect a specific type of attack often involve either using a set of rules that are too rigid for easy application in varied circumstances or using a supervised machine learning model which requires labels that are very difficult and tedious to obtain. Other familiar solutions employ generic anomaly detection techniques which try to find behavior that is out-of-the-ordinary for a machine, presuming that such behavior may indicate a security risk. But this approach often relies on the history of a specific machine, which may not be representative enough to generalize from. Accordingly, a detection tool can yield too many false alarms to be efficient in practice.

In response to such challenges, the illustrated examples apply an adaptation of collaborative filtering to help detect unauthorized accesses to a computer network, such as storage, whether that is cloud storage or more localized storage such as hybrid storage or entirely on-premises storage. Collaborative filtering has been applied in recommendation systems, such as those which recommend, to a particular consumer, a movie to watch or a product to buy. The recommendation is based on the actions of other consumers. The recommendation system works by using existing ratings that have been given by users to products, in order to predict ratings of unrated products. Ratings can be explicit, such as the score a user applies to a product, or implicit or inferred, such as whether the user exchanged the product, stopped using the product and other information. Collaborative filtering in the context of a commerce site is based on the premise that if a particular consumer agreed with the other consumers about other movies or products, the consumer is likely to also agree with them about a particular movie or product the consumer is considering.

As an illustrated example, users ($u_1$-$u_n$) may be listed along one side of a matrix or as a set of vertices on a bipartite graph and items ($i_1$-$i_m$) are listed along an adjacent side of the matrix or as another set of vertices on a bipartite graph. A particular user-item combination ($u_j$, $i_k$) such as in the matrix can be associated with a score, or as a path between two vertices of the bipartite graph is associated with a score. The score can be provided as an input. In many examples, the matrix is initially sparsely populated with inputs. Examples of collaborative filtering can apply latent feature vectors, for which low-rank matrix factorization are used. A low-rank latent factor model associates with each user and with each item a vector for which each vector component measures the tendency of user or item toward a certain factor or feature. For example, if the user is a person, the user features may include age, gender, education level, income level, and geographic location, and if the item is a movie, the item features may include genre, date, actors, critic rating, and awards. Once the inputs to the matrix or paths of the bipartite graph are computed, they are used to build the system and predict the unknown or unestablished ratings.

Collaborative filtering is adapted by teachings herein to help protect network storage accounts from cyberattacks by detecting unrecommended access. Adaptations described herein calculate a recommendation score or rating for access to a network item such as storage account. The score can be calculated based on existing scores, which may be implicit ratings, which may include access permissions and other information, or on explicit ratings such as applied by an administrator. In one example, a relatively low score of a new operation on a network item such as a storage account may indicate an anomaly that is a potential security risk. In some examples, a relatively high score may indicate the security risk.

In one example, the intrusion detection system models network items, such as stored items as items in a matrix or bipartite graph, and includes properties extracted from a network access operation, such as internet protocol (IP) address, username, user agent, as users in the matrix or bipartite graph. The adaptation builds and uses a collaborative filtering approach between the users (such as the access properties) and items (such as the accessible storage items) to recommend new (i.e., unrated) items for accessors. In one example, collaborative filtering is applied by building a sparse matrix of accessor IDs and storage item IDs, for example. Techniques such as matrix factorization are then applied to calculate missing values (recommendation scores) in this sparse matrix. In one example, relative scores (such as relatively low scores or relatively high scores) are used as an indication that the specific interaction is not likely to be indicative of normal behavior, and the recommendation score produced by the adapted collaborative filter can be used to detect cyberattacks in a network account such as a storage account.

Computing users and items matrices is often an early stage of building a recommendation system or the intrusion detection system, so there is a tendency to want to compute the factorizations quickly. In the application of intrusion detection systems, it has been determined that the bipartite graph of users ($u_1$-$u_n$) and items ($i_1$-$i_m$) connected along paths may include more than one connected component. As applied in this disclosure, a connected component of an undirected graph is an induced subgraph in which any two vertices are connected to each other by paths, and which is connected to no additional vertices in the rest of the graph. For example, a vertex with no incident edges is itself a connected component, and a graph that is itself connected has exactly one component, consisting of the whole graph. Collaborative filtering for items from in different connected components cannot add information for them. For example, a dot product between the latent feature vectors does not yield a useful result.

Figure 2:
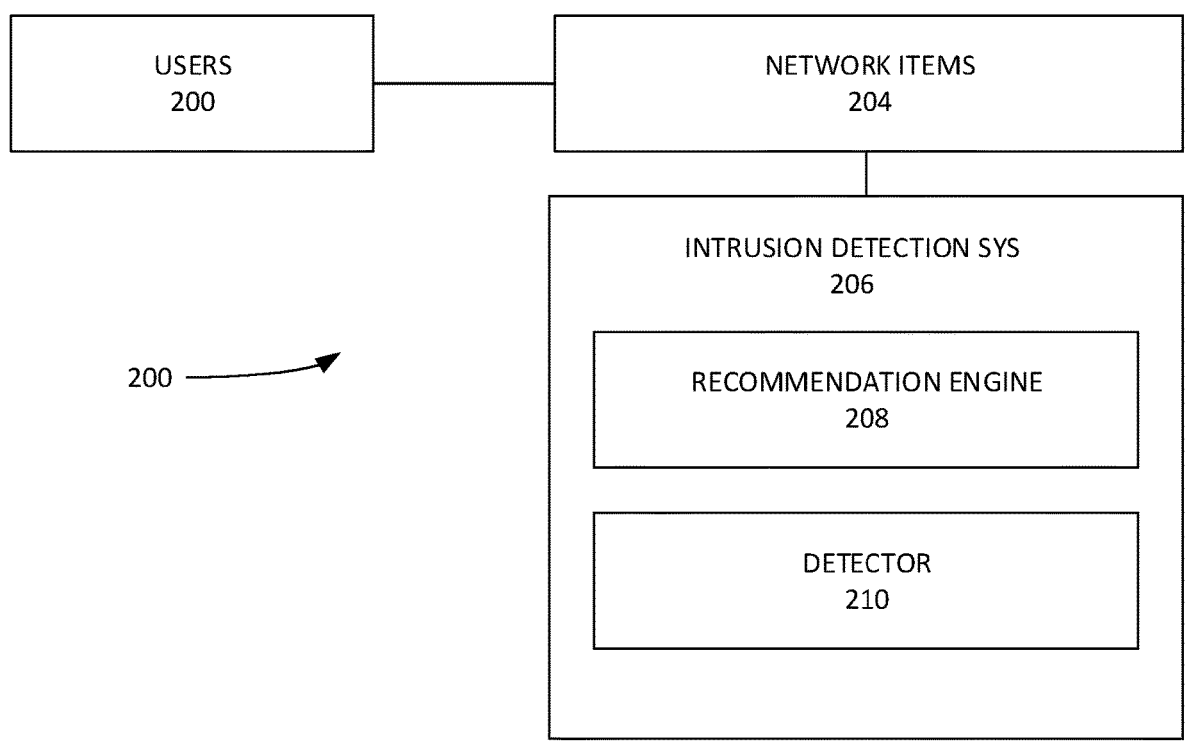
FIG. 2 is a block diagram illustrating an example computer network such as a cloud-computing environment that can be implemented with the computing device of FIG. 1.

FIG. 2 illustrates an example computer network 200, such as a local network, a cloud computing network, or a combination of networks that may include a set of users 202, a set of network items 204 accessible or accessed by the users 202, and an intrusion detection system 206 operably coupled to the network to determine which network items 204 are being accessed or attempted to be accessed by the users 202.

The user 202 has one or more accessor IDs. For example, an individual user may have accessor IDs that include a username or user account number, which is used for multiple accesses, and may be attempting a particular access with a request that originates from an application program that is using a particular source IP address and source port. As another example, a user 202 may be a program, such as a file transfer program, which authenticated anonymously (no username, or generic username such as "guest") but nonetheless sends the access request using a particular source IP address and source port. The access request seeks access to one or more items 204, such as an item in storage, and includes a storage item ID to identify the item(s) for which access is requested. Permissions may be associated with the accessor (e.g., a token), with the storage item (e.g., an ACL or file system permission), or both.

An accessor ID is a characteristic, property, attribute, or other value associated with a user $u_j$, of users $(u_1-u_n)$ 202, such as person, device, or other entity, that is seeking access to a network item, which value fully or partially identifies that entity relative to other entities that have accessed the storage item or have the technological capability to attempt to access the storage item. Illustrated examples of accessor IDs include a source IP address, source port number for TCP or UDP or another transport protocol, alphanumeric username, user agent ID, user group ID, user role ID, internal user account ID, or network interface identifier such as an IP address or MAC address.

A network item $i_k$ of network items $(i_1-i_m)$ 204 is a unit of network allocation identified in an access request from a user $u_j$, of users $(u_1-u_n)$ 202. Network items 204 may include logical or virtual items and physical cluster or sectors; and are defined at a level that is visible to end users as individual items, such as a file or binary large object or table. Illustrated examples of network items 204 as storage items include files, objects, blocks, binary large objects, logs, containers, tables, and queues. Storage items may be located in a cloud as cloud-based storage items that are allocated by a cloud service using infrastructure.

Users 202 may attempt to access network items 204 via a mechanism of a plurality of mechanisms. For instance, a user may provide a request to an access service or program that responds to the request to access with an action selected from a set of available actions. For example, a cloud-based storage queue or other service to receive or respond to the request to access.

Intrusion detection system 206 can include a recommendation engine 208 that applies a collaborative filtering mechanism to provide recommendation scores for a particular user-item combination $(u_j, i_k)$ such that each user-item combination $(u_j, i_k)$ is associated with a score, $(u_j, i_k) \Rightarrow S_{jk}$. In one example, the intrusion detection system 206 can include a detector 210 to assess a risk of intrusion and take an appropriate action. The intrusion detection system 206 includes a processor in operable communication with a memory device to perform a method of the recommendation engine 208 and can also perform a method of the detector 210. In one example, the intrusion detection system can be implemented on a computing device such as computing device 100. For instance, the intrusion detection system 206 can be implemented as a cloud component in an infrastructure-as-a-service that is operably coupled to a computer network, such as cloud tenant, having a plurality of users or accessors and a plurality of network items such as storage items. Accordingly, the intrusion detection system 206 can be provided as a service to a plurality of diverse cloud tenants and other computer networks. Also, the intrusion detection system 206 can be provided to a single, local computer network as a system dedicated to serving the computer network.

In one example, a user $u_j$ can corresponds with an accessor ID and an item $i_k$ corresponds with a storage item ID. A user-item combination $(u_j, i_k)$ can be formed between each user $u_j$, of users $(u_1-u_n)$ 202 and each item $i_k$ of network items $(i_1-i_m)$ 204 for n×m combinations. User-item combinations $(u_j, i_k)$ can be stored in a memory device with a location to receive a score $S_{jk}$ associated with the user-item combination $(u_j, i_k)$ and modeled as an n×m matrix. In one example, a user $u_j$ can corresponds with an accessor ID and an item $i_k$ corresponds with a storage item ID. For at least one user-item combination $(u_j, i_k)$ a score $S_{jk}$ associated with the user-item combination $(u_j, i_k)$ has not been assigned, but a space for the recommendation score $S_{jk}$ is provided in the memory device. A given user or accessor ID may appear in zero or more user-item combinations $(u_j, i_k)$ and a given network item or storage item may appear in zero or more user-item combinations $(u_j, i_k)$.

Figure 3:
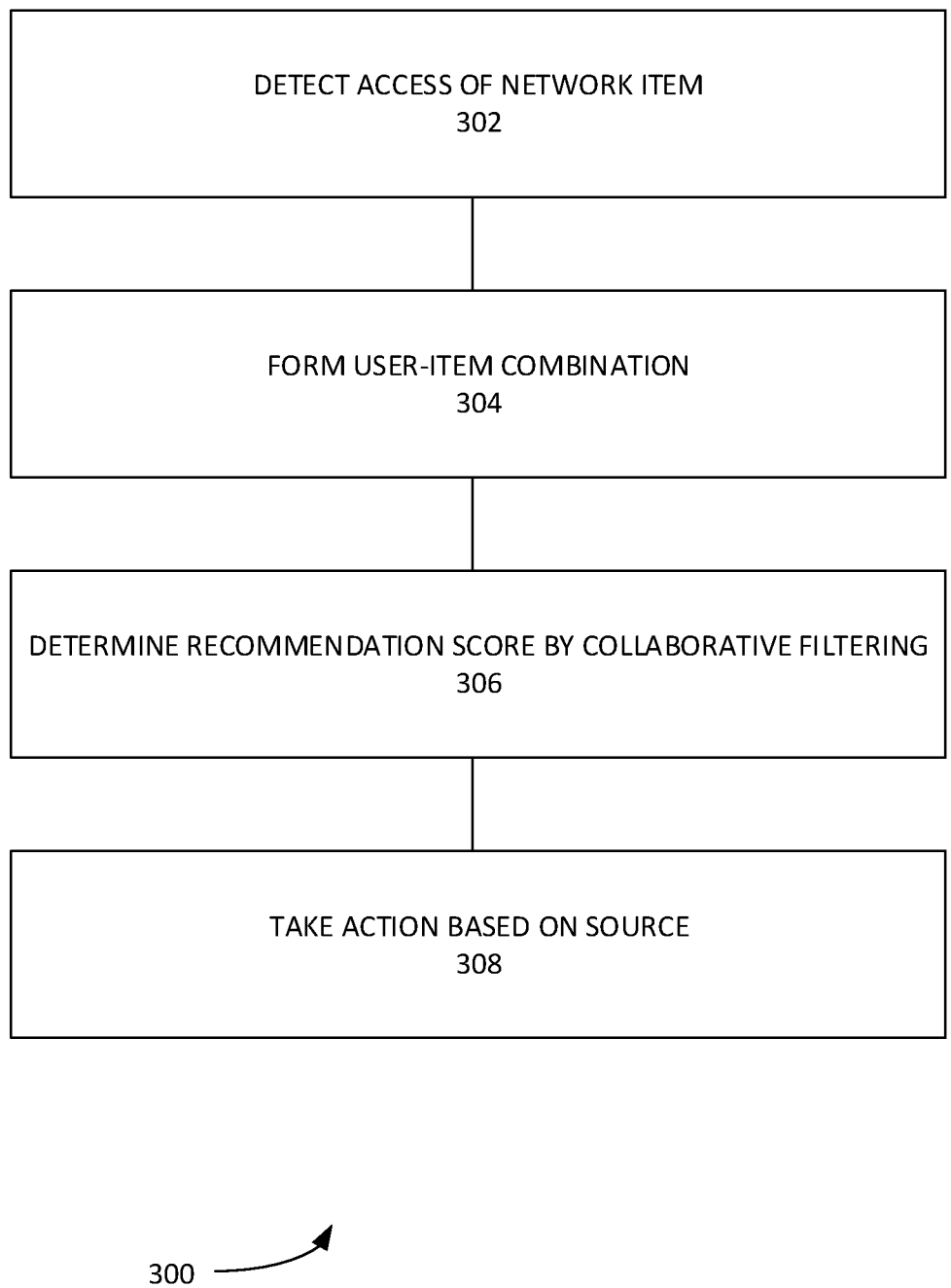
FIG. 3 is a block diagram illustrating an example method that can be implemented with the example intrusion detection system of the computing network of FIG. 2.

FIG. 3 illustrates a method 300 performed with or assisted by the recommendation engine 208 and detector 210 of the intrusion detection system 200. In one example, the method 300 is implemented as system having a processor and a memory device such as processor 102 and memory 104 on computing device 100. The memory device, such as memory 104 can be applied to store computer executable instructions for causing the processor 102 to perform the method 300, such as a program for intrusion detection. The program for intrusion detection can include a program for a recommendation engine, such as recommendation engine 208, and a program for a detector, such as the detector 210. The program for the recommendation engine 208, which can reside in a memory device and be executed by a processor performs the method 300, includes collaboratively filtering a plurality of user-item combinations $(u_j, i_k)$ and determining an associated score $S_{jk}$ for the user-item combinations $(u_j, i_k)$ that can be stored in the memory device and applied as measure of relative risk of intrusion. The program for the detector 210 can reside in a memory device and be executed by a processor and be operably coupled to the recommendation engine to perform the method 300.

Method 300 includes detecting an attempt to access a network item at 302. In one example, the attempt to access is detected at 302 such as by funneling access attempts between users and network items of an operating environment through a service, or through a firewall or IDS or IPS system that includes features to detect the attempts to access. An example user-item combination $(u_j, i_k)$ is formed 304 between the user attempting to access and the network item on which access is attempted. In one example, user-item combinations $(u_j, i_k)$ are formed by extracting the storage item ID and accessor ID from the request to access and placing them in a data structure. A recommendation score $S_{jk}$ for user-item combinations $(u_j, i_k)$ is determined by collaborative filtering at 306 by separately performing computations for connected components as described, via using other user-item combinations $(u_j, i_k)$, and by using leveraged implementations of familiar collaborative filtering libraries. For instance, the collaborative filtering at 306 can include matrix factorization and latent factor models. The recommendation score can be used via the detector 210 or a rating, such as an intrusion risk rating can be applied to the detector 210, in which the rating is based on the recommendation score. The intrusion detection system 206 or related components such as detector 210 can take an action based on the recommendation score at 308. Examples of possible actions at 308 include preventing access to the storage item identified in the request, terminating an access-in-progress to the storage item identified in the request, alerting an administrator, or actively allowing the access after comparison of the recommendation score to a pertinent threshold. For instance, actions that can be taken can include actions after a request for access is received but prior to access and actions after an access is detected including accesses that have received access in response to a request.

In some examples, a recommendation score is compared to a threshold, and an action is taken depending on how the recommendation score relates to the threshold in a selected manner. For instance, a relatively low recommendation score may be indicative of increasing risk, and a threshold value may be set such that recommendation scores of user-access combinations falling below the threshold value are denied access while recommendation scores of user-access combinations falling above the threshold value are allowed access. In other examples, a plurality of actions can be implemented based on a plurality of thresholds. For example, two threshold values may be used in which a first threshold value is greater than a second threshold value. In this example, recommendation scores of user-access combinations falling above the first threshold value are allowed access; recommendation scores falling between the first and second threshold value may provide a conditional access; and recommendation scores of user-access combinations falling below the second threshold value are denied access.

Figure 4:
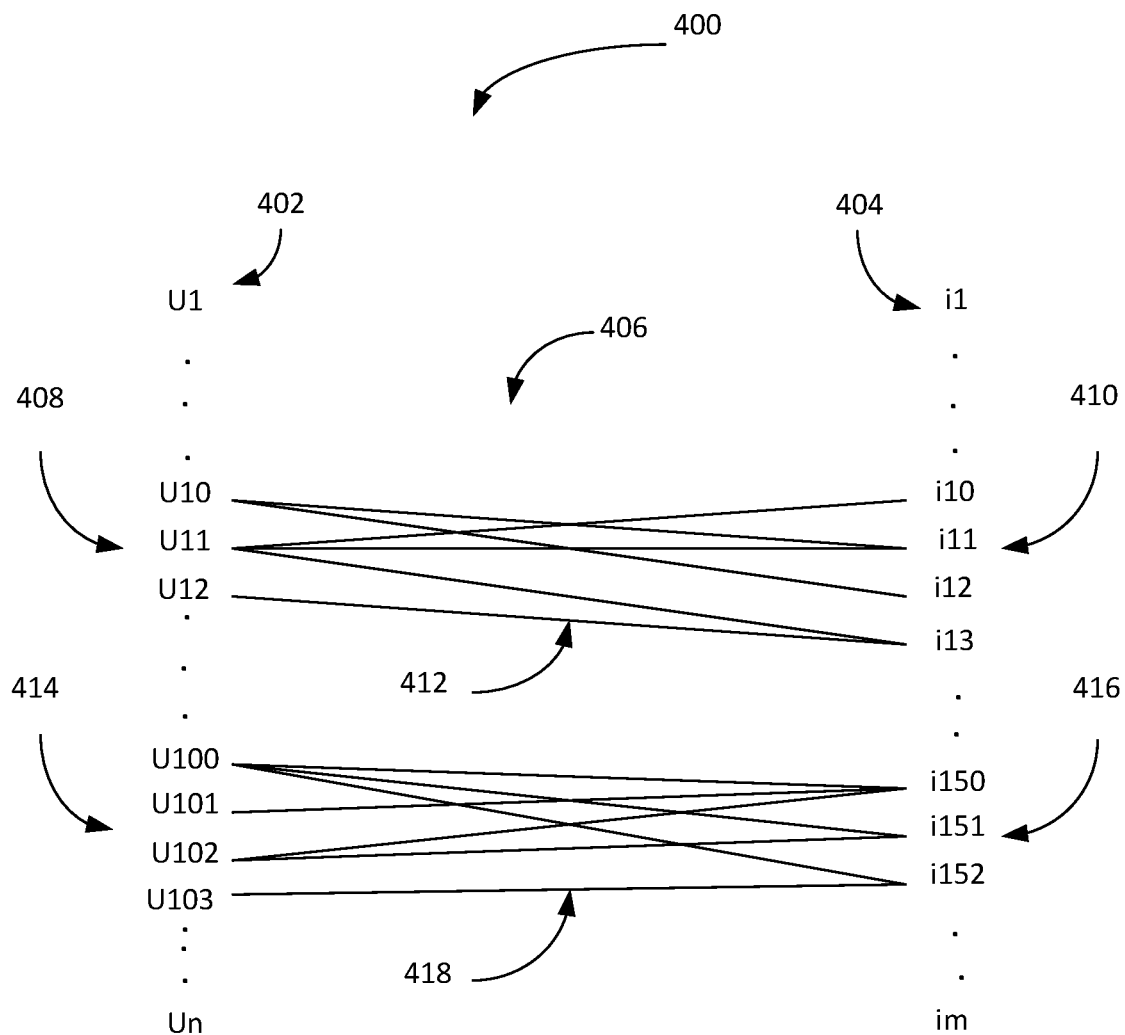
FIG. 4 is a block diagram illustrating an example model of the computer network of FIG. 2.

FIG. 4 illustrates a particular implementation of the computer network 200. In this implementation, the network 200 is modeled as a bipartite graph 400 in which users 202 are modeled as user vertices 402 on a first side of the graph 400 and network items 204 are modeled as network item vertices 404 on a second side of the graph 400. The particular user-item combination $(u_j, i_k)$ are modeled as paths 406 between vertices 402, 404 and each modeled path can be associated with a score, $(u_j, i_k) \Rightarrow S_{jk}$. No other relationships are represented in this example such as no complex hierarchies are represented in the bipartite graph.

In the application of intrusion detection system 206, the bipartite graph 400 generated of users vertices $(u_1, u_n)$ 402 and item vertices $(i_1, i_m)$ 404 connected along paths 406 may include more than one connected component. As applied in this disclosure, a connected component of an undirected graph is an induced subgraph in which any two vertices are connected to each other by paths, and which is connected to no additional vertices in the rest of the graph. By way of illustration, the connections between a first group of users $(u_{10}, u_{12})$ 408 and a first group of items $(i_{10}, i_{13})$ 410 on graph 400 include one, or a first, connected component 412 and the connections between a second group of users $(u_{100}-u_{103})$ 414 and a second group of items $(i_{150}-i_{152})$ 416 on graph 400 include another, or a second, connected component 418. The graph 400 may have additional connected components such as two or more connected components. Collaborative filtering for items from different connected components 412, 418 cannot add information for them. For example, a dot product between the latent feature vectors does not yield a useful result.

Figure 5:
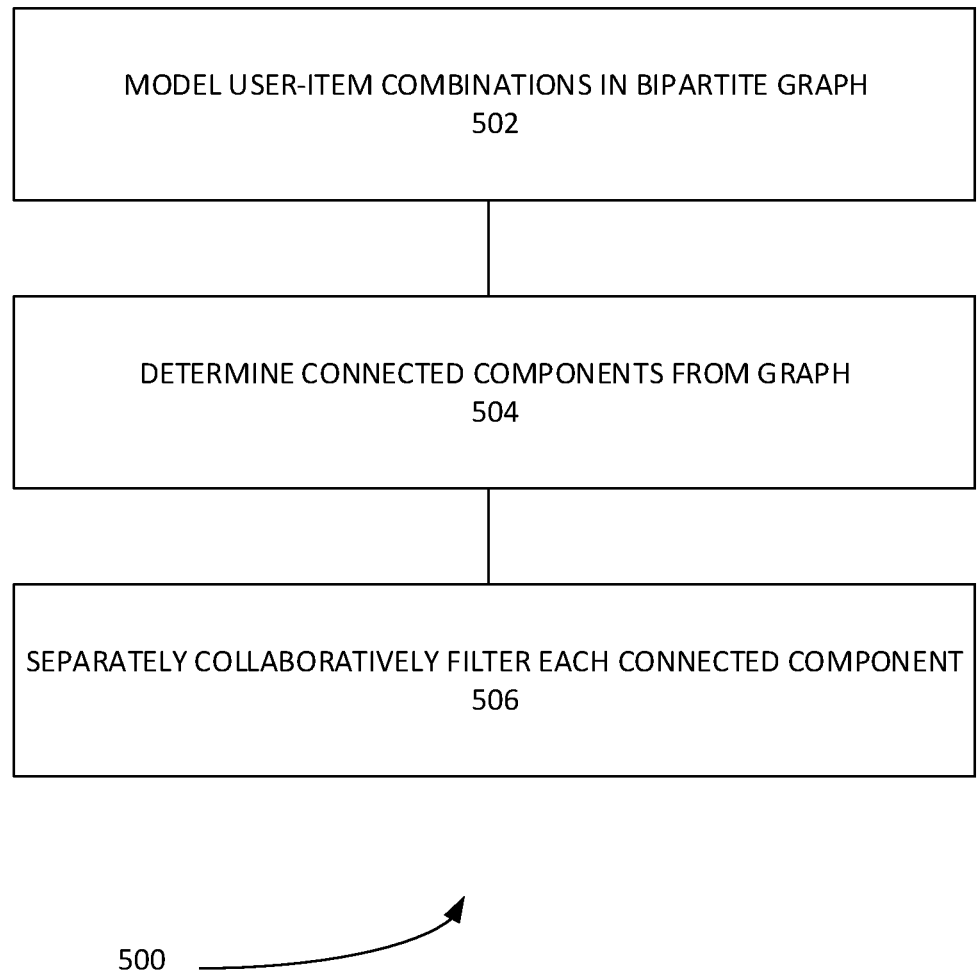
FIG. 5 is a block diagram illustrating an example method of the intrusion detection system of FIG. 2 as applied to FIG. 4, such as a feature of the method of FIG. 3.

FIG. 5 illustrates a method 500 performed with or assisted by the recommendation engine 208 of the intrusion detection system 200. In one example, the method 500 is implemented as system having a processor and a memory device such as processor 102 and memory 104 on computing device 100. The memory device, such as memory 104 can be applied to store computer executable instructions for causing the processor 102 to perform the method 500. In one example, method 500 can be at least in part implemented by a program for the recommendation engine 208 in one example, a feature or aspect of method 300 in collaboratively filtering a plurality of user-item combinations $(u_j, i_k)$ and determining an associated score $S_{jk}$ for the user-item combinations $(u_j, i_k)$ that can be stored in the memory device and applied as measure of relative risk of intrusion. In one example, the program for the recommendation engine can include features to permit concurrent or parallel processing on a system having a plurality of processing nodes, such as multiple processing cores.

For instance, as part of collaboratively filtering at 306, user-item combinations $(u_j, i_k)$ with associated scores $S_{jk}$ are determined, such as extracted from memory. In one example, user-item combinations $(u_j, i_k)$ are formed by extracting the storage item ID and accessor ID from the request to access and placing them in a data structure in memory. In one example, the user-item combinations $(u_j, i_k)$ are modeled as a bipartite graph 400 in the data structure, such as one bipartite graph at 502. Connected components 406 of the bipartite graph 400 are identified at 504. For example, code, libraries, or programs can be applied to the model to determine connected components in the user-item combinations $(u_j, i_k)$ of the bipartite graph. In one example, two or more connected components 412, 418 are identified from the one bipartite graph. Each identified connected component is itself modeled as a bipartite graph, or more particularly as a sub-bipartite graph of the one bipartite graph. In the example, the bipartite graph 400 yields a plurality of sub-bipartite graphs 412, 418 or connected components at 504. Each connected component is separately collaboratively filtered at 506. Recommendation scores $S_{jk}$ for the user-item combinations $(u_j, i_k)$ in each sub-bipartite graph is separately determined by collaborative filtering techniques such as via using other user-item combinations $(u_j, i_k)$ and by using leveraged implementations of familiar collaborative filtering libraries at 506. The recommendation scores are mapped back to the associated user-item combination.

By separately collaboratively filtering each sub-bipartite graph, or each connected component, of the bipartite graph, the processing is directed at collaboratively filtering a connected component rather than the bipartite graph as a whole. Collaboratively filtering the bipartite graph is broken into separately collaboratively filtering the connected components. For example, a set of data associated with collaboratively filtering a connected component, which is distinguishable from the set of data for collaboratively filtering the entire bipartite graph, is loaded into processing resources, such as a processor and memory, to be collaboratively filtered and provide an output. For instance, the collaborative filtering for each sub-bipartite graph of the plurality of sub-bipartite graphs determined can include matrix factorization and latent factor models. In one example, the connected components can be collaboratively filtered sequentially, such as one connected component is collaboratively filtered after another connected component is finished being collaboratively filtered. In another example, collaborative filtering techniques are applied to concurrently process the connected components, or each of the sub-bipartite graphs. In one implementation, a bipartite graph with many connected components can quickly and efficiently be collaboratively filtered when the connected components are collaboratively filtered in parallel with concurrent processing resources. In one example, the concurrent collaborative filtering processing of the sub-bipartite graphs can be done in a cloud compute environment that can scale the processing of each sub-bipartite graphs. In another example, the separate and independent processing of the sub-bipartite graphs can include concurrently processing several sets of sub-bipartite graphs in a limited sequence, such as in waves. In one example, the recommendation engine 208 is constructed to permit parallel processing of the connected components. Separately processing the connected components as sub-bipartite graphs, such as concurrently processing the connected components as sub-bipartite graphs in which each sub-bipartite graph includes exactly one connected component, can yield improved performance over processing a single bipartite graph with many connected components. The processing generates a recommendation score $S_{jk}$ for user-item combinations ($u_j$, $i_k$), which can be applied to a detector 210 to take an action based on the recommendation score at 308.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method to provide cybersecurity for a computer network, the method comprising:
    determining a plurality of groups of a plurality of user-item combinations associated with the computer network based on a group of the plurality of user-item combinations being defined as comprising multiple user-item combinations modeled as paths that are connected to at least one other path of the group of the plurality of user-item combinations and that are connected to no other paths of other user-item combinations in the other groups of the plurality of user-item combinations, wherein a user-item combination is defined as comprising a user that performs an attempt to access a network item and further comprising the network item;
    detecting an attempt of an identified user to access an identified network item;
    determining a recommendation score for a particular user-item combination, which includes the identified user that performs the attempt to access the identified network item and which further includes the identified network item, by collaboratively filtering the plurality of groups of the plurality of user-item combinations separately and independently, wherein the recommendation score is a measure of intrusion risk; and
    performing an action, which is based on the recommendation score, with regard to the attempt to access the identified network item.

2. The method of claim 1, wherein the plurality of groups of the plurality of user-item combinations are collaboratively filtered in parallel.

3. The method of claim 1, wherein the attempt to access the identified network item includes an access of the identified network item.

4. The method of claim 1, wherein the action is based on a comparison of the recommendation score to a selected threshold.

5. The method of claim 1, wherein the action is associated with a comparison of the recommendation score to two thresholds.

6. The method of claim 1, wherein the collaboratively filtering includes a matrix factorization.

7. The method of claim 1, wherein the particular user-item combination includes a latent feature vector.

8. The method of claim 7, wherein the particular user-item combination is a user-storage item combination, which includes the identified user that performs the attempt to access a storage item and which further includes the storage item in a computer network.

9. The method of claim 1, wherein the identified user is associated with an accessor ID and the identified network item is associated with a network item ID.

10. A computer readable storage device that stores computer executable instructions that enable a processor-based system to:
    determine a plurality of groups of a plurality of user-item combinations associated with a computer network based on a group of the plurality of user-item combinations being defined as comprising multiple user-item combinations modeled as paths that are connected to at least one other path of the group of the plurality of user-item combinations and that are connected to no other paths of other user-item combinations in the other groups of the plurality of user-item combinations, wherein a user-item combination is defined as comprising a user that performs an attempt to access a network item and further comprising the network item;
    determine a recommendation score for a particular user-item combination, which includes an identified user that performs an attempt to access an identified network item and which further includes the identified network item, by collaboratively filtering the plurality of groups of the plurality of user-item combinations separately and independently, wherein the recommendation score is a measure of intrusion risk; and
    perform an action, which is based on the recommendation score, with regard to the attempt to access the identified network item.

11. The computer readable storage device of claim 10, wherein the computer executable instructions enable the processor-based system to:
    determine the recommendation score based on a second user-item combination, which includes a second user that performs a second attempt to access a second network item and which further includes the second network item.

12. The computer readable storage device of claim 11, wherein the particular user-item combination and the second user-item combination are included in a same group of the plurality of groups of the plurality of user-item combinations.

13. The computer readable storage device of claim 10, wherein the computer executable instructions enable the processor-based system to:
    perform parallel processing of the plurality of groups of the plurality of user-item combinations.

14. The computer readable storage device of claim 10, wherein the computer executable instructions enable the processor-based system to:
    based on the recommendation score being less than a first threshold, perform a first action with regard to the attempt to access the network item;
    based on the recommendation score being greater than the first threshold and less than a second threshold, perform a second action with regard to the attempt to access the network item; and
    based on the recommendation score being greater than the second threshold, perform a third action with regard to the attempt to access the network item; and wherein the first action, the second action, and the third action are different.

15. A system comprising:
a memory device to store a set of instructions; and
a processor to execute the set of instructions to:
   determine a plurality of groups of a plurality of user-item combinations associated with the computer network based on a group of the plurality of user-item combinations being defined as comprising multiple user-item combinations modeled as paths that are connected to at least one other path of the group of the plurality of user-item combinations and that are connected to no other paths of other user-item combinations in the other groups of the plurality of user-item combinations, wherein a user-item combination is defined as comprising a user that performs an attempt to access a network item and further comprising the network item;
   determine a recommendation score for a particular user-item combination, which includes an identified user that performs an attempt to access an identified network item and which further includes the identified network item, by separately collaboratively filtering the plurality of groups of the plurality of user-item combinations, wherein the recommendation score is a measure of intrusion risk; and
   perform an action, which is based on the recommendation score, with regard to the attempt to access the identified network item.

16. The system of claim 15, wherein the processor is to execute the set of instructions to concurrently process the plurality of groups of the plurality of user-item combinations.

17. The system of claim 15 included in a cloud-based environment.

18. The system of claim 17, wherein the cloud-based environment includes a cloud-based storage queue to receive or respond to a request to access the identified network item.

19. The system of claim 15, wherein the processor is to execute the set of instructions to determine the recommendation score for the particular user-item combination by collaboratively filtering the plurality of groups of the plurality of user-item combinations separately and independently.

20. The system of claim 15, wherein the processor is to execute the set of instructions to:
   model the plurality of groups of the plurality of user-item combinations as a plurality of sub-bipartite graphs of a bipartite graph; and
   determine the recommendation score for the particular user-item combination by separately collaboratively filtering the plurality of sub-bipartite graphs rather than by collaboratively filtering the bipartite graph as a whole.

* * * * *